(12) United States Patent
Cornwell et al.

(10) Patent No.: US 8,086,330 B1
(45) Date of Patent: Dec. 27, 2011

(54) ACCESSING ACCELEROMETER DATA (75) Inventors: Michael J Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 479 days.

(21) Appl. No.: 11/739,851

(22) Filed: Apr. 25, 2007

(51) Int. Cl.
- *G05B 11/32* (2006.01)
- *G06F 3/038* (2006.01)
- *G06F 3/033* (2006.01)
- *G09G 5/00* (2006.01)
- *G09G 5/08* (2006.01)

(52) U.S. Cl. .......... 700/69; 345/204; 345/205; 345/649; 345/158; 360/75; 73/514.34

(58) Field of Classification Search .................. None
See application file for complete search history.

(56) References Cited

U.S. PATENT DOCUMENTS

| | | | | |
|---|---|---|---|---|
| 5,835,298 | A * | 11/1998 | Edgerton et al. | 360/75 |
| 6,098,460 | A * | 8/2000 | Otsuchi et al. | 73/514.34 |
| 6,704,007 | B1 * | 3/2004 | Clapper | 345/204 |
| 6,748,555 | B1 * | 6/2004 | Teegan et al. | 714/38 |
| 7,059,182 | B1 * | 6/2006 | Ragner | 73/200 |
| 7,450,332 | B2 * | 11/2008 | Pasolini et al. | 360/75 |
| 2001/0024949 | A1 * | 9/2001 | Yanagida et al. | 455/404 |
| 2006/0152842 | A1 * | 7/2006 | Pasolini et al. | 360/75 |
| 2007/0156679 | A1 * | 7/2007 | Kretz et al. | 707/6 |

* cited by examiner

*Primary Examiner* — Ryan Jarrett
*Assistant Examiner* — Sunray Chang
(74) *Attorney, Agent, or Firm* — Fish & Richardson P.C.

(57) ABSTRACT

Systems and processes for accessing acceleration data may include an accelerometer coupled to a nonvolatile memory. The nonvolatile memory may be coupled to a processor. Acceleration data may be obtained from the accelerometer via a bus coupling the nonvolatile memory to the accelerometer. Acceleration data may be sent from the nonvolatile memory to a processor. One or more operations may be performed based on the acceleration data.

19 Claims, 5 Drawing Sheets

ACCESSING ACCELEROMETER DATA

TECHNICAL FIELD

The present invention relates to systems and processes for accessing data, and more particularly to accessing accelerometer data.

BACKGROUND

Accelerometers have been coupled to hard drives to detect sudden changes in velocity. When a sudden change in velocity is detected (e.g., when the laptop is dropped), the head of the hard drive is moved away from the disk in the drive so that damage to the disk does not occur. Accelerometers may also be coupled to a tablet personal computer (tablet PC) to determine the orientation of the tablet PC. When the orientation of the laptop is determined, the orientation of displayed material on a screen may be rotated.

SUMMARY

Acceleration data may be detected by an accelerometer and transmitted to a memory. A memory may transmit the acceleration data to a processor. The processor may analyze the acceleration data and/or one or more processes may be performed based on the acceleration data received by the processor.

In one general aspect, acceleration data is detected using an accelerometer coupled to a nonvolatile memory of a device and transmitted from the nonvolatile memory to a processor of the device. The processor controls operations of the device and performs one or more operations based on the transmitted acceleration data.

Implementations may include one or more of the following features. The processor may be operable to control operations of the device. Acceleration data may be requested from the nonvolatile memory. Acceleration data may be analog and/or preprocessed data. An orientation of the device may be determined based on the acceleration data and operations may be performed based on the determined orientation. Nonvolatile memory may be a disk drive. Acceleration data may be transmitted from the accelerometer to the nonvolatile memory via the bus coupling the accelerometer and the nonvolatile memory. Accelerometer data may be transmitted from the nonvolatile memory to a processor via a bus coupling the nonvolatile memory and the processor.

In another general aspect, a request for acceleration data is sent to a nonvolatile memory of a device across a bus coupled to the nonvolatile memory. The acceleration data is provided to the nonvolatile memory by an accelerometer, which is physically coupled to the nonvolatile memory. The acceleration data is received across the bus coupled to the nonvolatile memory and one or more operations are performed based on the received acceleration data.

Implementations may include one or more of the following features. An analysis of the acceleration data may be performed. Operations may be performed based on the analysis.

In another general aspect, an accelerometer provides acceleration data to a nonvolatile memory of the device, where a bus couples the accelerometer to the nonvolatile memory. An analysis module retrieves the acceleration data from the nonvolatile memory and performs one or more operations on the device based on the retrieved acceleration data.

Implementations may include one or more of the following features. Accelerometer data may be analog data and/or preprocessed data. An analysis module may analyze the analog data. An analysis module may retrieve acceleration data when a specified operation occurs. Nonvolatile memory may be a disk drive. The nonvolatile memory may be operable to perform operations based on the acceleration data provided by the accelerometer. The bus may couple the nonvolatile memory to a processor of the device. The processor may control the operations of the device and/or may access data stored on the nonvolatile memory. The bus may be an electrical connector. The electrical connector may include a plurality of pins. At least one of the pins may transmit data between the accelerometer and the analysis module. Acceleration data may be continuously transmitted from the nonvolatile memory and/or continuously retrieved by the analysis module. The acceleration data may be retrieved by the analysis module when a specified operation occurs.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
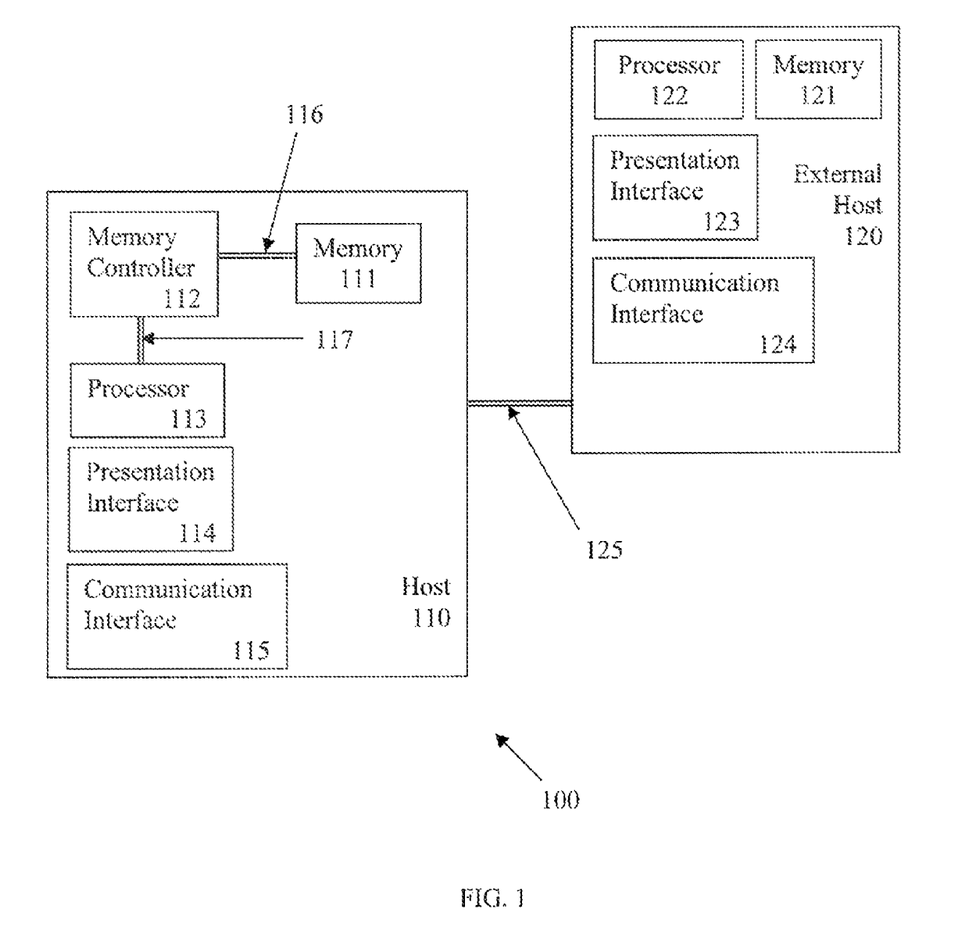
FIG. 1 illustrates an example of a host coupled to an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), nonvolatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the entire block in which the cell resides. Similarly, writing new data to a portion of a block may require erasing the entire block and rewriting any unchanged portions of the block along with the new data.

Figure 2:
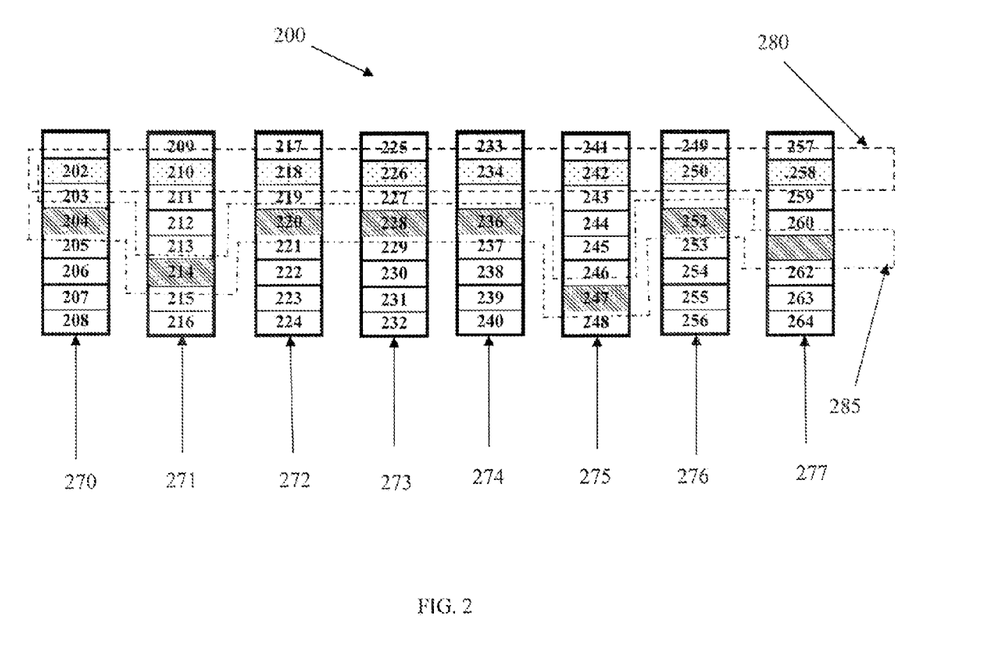
FIG. 2 illustrates an example of a memory controller coupled to a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280 and 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 SuperIntegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
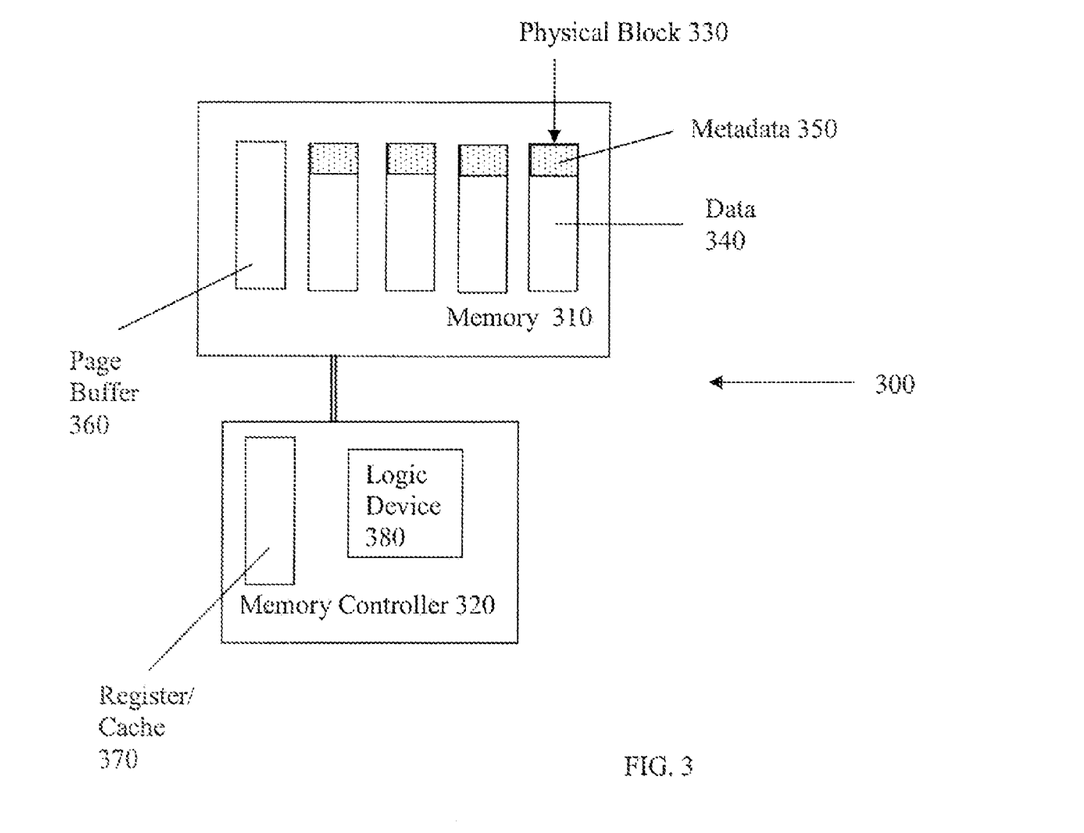
FIG. 3 illustrates an example configuration of a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330.

Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.a The memory controller 320 may receive requests to read and/or write data to memory 310. The memory controller 320 may format the requests to an instruction format appropriate for the memory 310 (e.g., from or to IDE/ATA format). The memory controller 320 may then transfer the requests in the appropriate format to the memory 310. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

In some implementations, an accelerometer may be coupled to a memory of a host. An accelerometer may measure acceleration data (e.g., orientation or acceleration) of a memory. For example, an accelerometer may determine if a memory is at an angle. Acceleration data may be used to measure gravity, position, velocity, angular velocity, and/or rapid negative acceleration.

An accelerometer may be a 3D accelerometer, Micro-Electro-Mechanical Systems (MEMS) accelerometer, an electromechanical accelerometer, piezoelectric accelerometer, piezoresistive accelerometer, magnetoresistive accelerometer, capacitive accelerometer, accelerometers that use the Hall effect and/or heat transfer, and/or other accelerometers. Accelerometers may be accelerometers commercially available from Texas Instruments Inc. (Dallas, Tex.), Freescale (Austin, Tex.), Honeywell (Morristown, N.J.), and VTI Technologies (Dearborn, Mich.). An accelerometer may measure dynamic acceleration or the way memory is moving. An accelerometer may detect sudden movements, such as prior to a fall.

Figure 4:
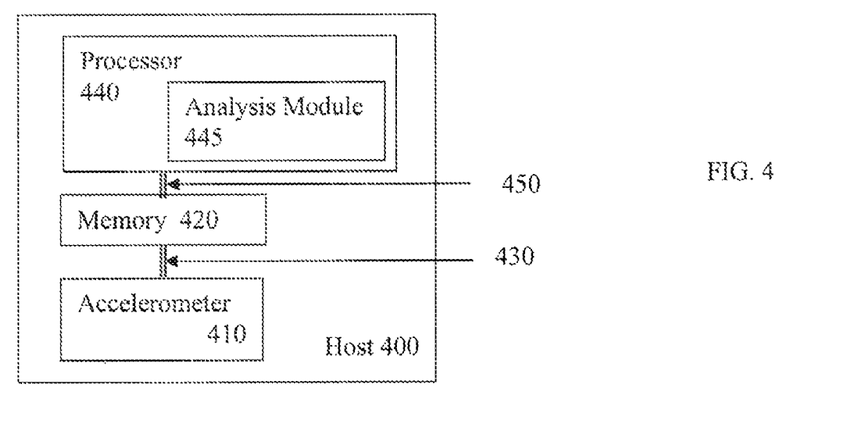
FIG. 4 illustrates an example of an accelerometer coupled to a memory.

FIG. 4 illustrates an example of an accelerometer 410 coupled to a memory 420 of a host 400. Accelerometer 410 may be physically coupled to memory 420. For example, accelerometer 410 may be physically attached to a portion of memory 420 or within or to a housing of the memory. Accelerometer 410 may be coupled to memory 420 using a bus 430.

Acceleration data may be transmitted from accelerometer 410 to memory 420. Acceleration data may be transmitted from memory 420 to a processor 440 of the host 400. Acceleration data may be transmitted as analog data or digital data. Acceleration data may be transmitted as processed data (e.g., 3-D coordinates) or unprocessed data (e.g., analog measurements). The processor 440 may analyze the unprocessed data to determine, for example, orientation, 3-D coordinates, movement, etc. An analysis module 445 of processor 440 may analyze acceleration data. For example, the analysis module 445 may determine movement and/or orientation by comparing acceleration data to previously received acceleration data. Processor 440 may perform various operations based on the analysis of the acceleration data.

A bus 450 may couple memory 420 to processor 440. Data may be transmitted to and/or from processor 440 via bus 450. In some implementations, bus 450 may include pins that connect and transmit data between memory 420 and processor 440. Bus 450 may include 24 pins (e.g., a 24-pin electrical connector). In some implementations, one or more pins of bus 450 may be dedicated to (e.g., data transmitted via the pin may relate to) supplying acceleration data to processor 440. For example, one pin of bus 450 may be dedicated to transmitting acceleration data from memory 420 to processor 440.

Another pin of bus 450 may be dedicated to transmitting data (e.g., requests for acceleration data or instructions for processing of acceleration data) from processor 440 to memory 420. One or more of the 24 pins may be dedicated to initiating or performing operations on the memory based on the acceleration data. Data may be transmitted via a pin continuously or periodically.

Figure 5:
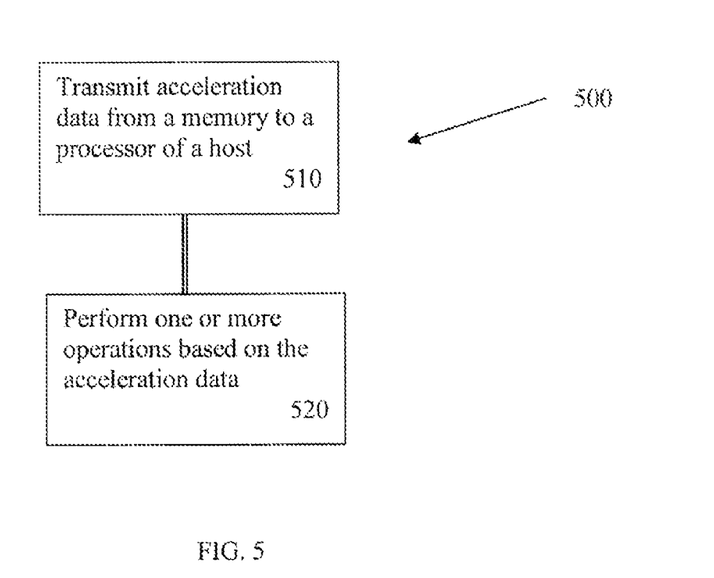
FIG. 5 illustrates an example process for accessing acceleration data.

FIG. 5 illustrates an example process 500 for transmitting acceleration data. Acceleration data may be detected by an accelerometer. The acceleration data may be used by the memory to inhibit skipping during reading or damage to the memory during reading, writing, and/or erasing. Acceleration data may be transmitted from a memory to a processor of a host (operation 510). At least some memory operations may be based on the acceleration data. For example, a processor may receive the acceleration data an perform memory operations based on the acceleration data, such as altering a position of an optical head of the memory to inhibit damage to the memory while the device is being dropped.

Acceleration data may be transmitted using a physical coupling between the accelerometer to the memory (e.g., the accelerometer may be hardwired to the memory). A bus may physically couple the memory and the processor. Data may be transmitted between the memory and the processor using the bus.

In some implementations, acceleration data may be requested and retrieved from the memory by the processor. The processor may periodically request acceleration data from the memory at specified intervals. The processor may request acceleration data before, during, or after performing specified operations or when specified events occur. For example, acceleration data may be requested prior to read and/or write operations. Acceleration data may be requested when a user specifies a mode (such as play mode or exercise mode) on the host. Acceleration data may be requested when a nonvolatile memory such as a hard drive is spinning and/or not spinning.

The processor may perform one or more processes based on the acceleration data (operation 520). For example, the processor may alter an orientation of a LCD screen based on acceleration data. The processor may adjust a sound level of the host. For example, if a host is moving at a velocity greater than a specified amount for a predetermined amount of time, it may indicate that a user of the device is running and increase the level of sound output from the host. As another example, if a host is moving at a velocity greater than a specified amount for a predetermined amount of time, it may indicate that a user of the device is running and inhibit write operations and/or wear leveling operations to decrease the likelihood of damage to a memory of the host.

A host may perform a variety of operations based on the acceleration data. Acceleration data may be used by the processor to correct for changing dynamic conditions. Acceleration data may be used to stabilize images taken with a camera coupled to or integrated in the host. Acceleration data may be used to measure distance traveled (e.g., via positional data, such as from a global positioning system, and acceleration data). Acceleration data may be used by the processor to align a graphical interface on a presentation interface (e.g., a screen) to the orientation of the host. For example, if a user is holding the device upside down (e.g., rotated approximately 180 degrees from specified orientation), the graphical interface displayed on the presentation interface may be rotated (e.g., rotated approximately 180 degrees from a specified orientation) to correspond to the orientation of the device. Acceleration data may be used to provide messages (e.g., visual and/or audio).

In some implementations, accelerometer data may be used by the processor to perform operations on a memory of the device. For example, a memory may use acceleration data to measure drive head speed (e.g., measure read/write speeds) to inhibit the drive from skipping during reading and/or writing. A memory may use acceleration data to detect falls and/or sudden movement to move a head away from disks in the drive. If a memory of a host is a nonvolatile magnetic memory, such as a hard drive, holding a position of a head of the memory may inhibit damage to the memory when the acceleration data satisfies specified conditions. As another example, prior to writing to a disk drive, acceleration data may be requested and/or analyzed. If acceleration data indicates a sudden change in acceleration, a write operation may be prevented. The processor may be able to perform similar and/or different operations as the memory controller of the host based on the acceleration data.

Although the implementations above describe a processor analyzing the acceleration data, a memory controller of a host may analyze data and/or perform one or more operations based on the acceleration data. The memory controller may be coupled to the memory via a bus.

Figure 6:
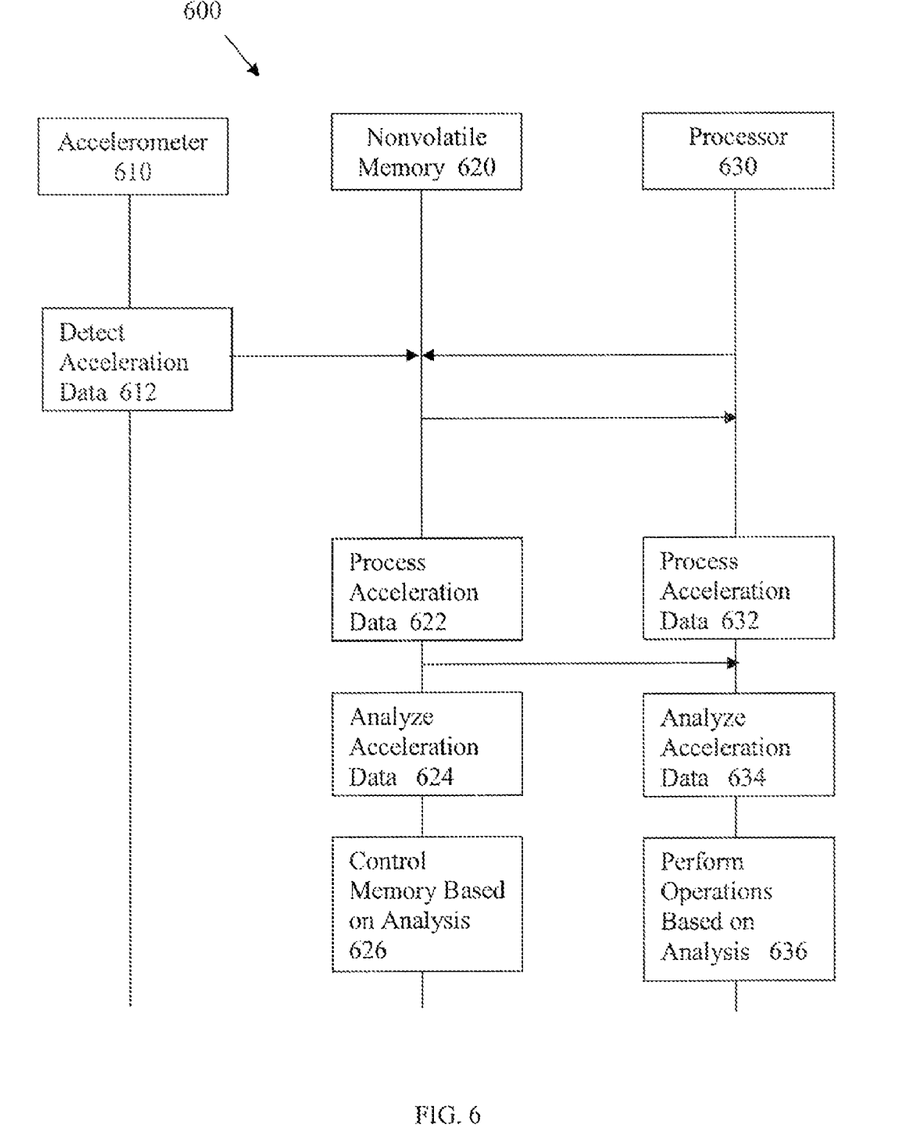
FIG. 6 illustrates a signaling and flow diagram for an example host.

FIG. 6 illustrates a signaling and flow diagram for an example host 600. Acceleration data from an accelerometer 610 may be used by more than one component of the host 600, such as the nonvolatile memory 620 (e.g., disk drive) and the processor 630, to perform operations. The accelerometer 610 and the nonvolatile memory 620 may be coupled (e.g., hard wired) and the nonvolatile memory 620 may be coupled to the processor 630 (e.g., using a bus). Acceleration data may be detected by the accelerometer 610 (operation 612) and transmitted to the nonvolatile memory 620 as unprocessed data (e.g., analog data).

The nonvolatile memory 620 may process the acceleration data (e.g., to determine coordinates, orientation, etc.) (operation 624). The acceleration data may be transmitted to the processor 630 from the nonvolatile memory 620 after processing rather than before processing, so that the processor receives processed data from the nonvolatile memory. The nonvolatile memory may control itself based on the analysis (operation 626). For example, the nonvolatile memory may control read, write, and/or erase operations based on the acceleration data.

The acceleration data may be transmitted from the nonvolatile memory 620 to the processor 620, for example, using a connection between the nonvolatile memory and the processor. The processor 610 may optionally request the acceleration data prior to transmission of the acceleration data to the processor from the nonvolatile memory 620. The acceleration data may be transmitted from the nonvolatile memory 620 as unprocessed data (e.g., analog data) or processed data (e.g., after the nonvolatile memory analyzes the acceleration data (operation 624)). If the acceleration data received by the processor 630 is unprocessed data, then the processor may analyze the acceleration data (operation 634). The processor 630 may also analyze the acceleration data received to determine which operations should be performed by the processor on the host 600 or components of the host. The processor 630 may then perform operations based on the analysis (operation 636). For example, the processor 630 may alter the orientation of an LCD screen of the host based on the analysis of accelerometer data.

In some implementations, a host may be a portable media player. A portable media player may be coupled to an external host (e.g., a PC, laptop, or cell phone) to receive data, such as music or videos to be uploaded to the portable media player from the external host. Prior to writing data to the memory (e.g., disk drive) of the portable media player, a processor of the portable media player may retrieve acceleration data from the nonvolatile memory. An accelerometer coupled to the nonvolatile memory may provide acceleration data to the nonvolatile memory. The processor may analyze the acceleration data received from the memory. If acceleration data indicates a sudden change in acceleration or an unsuitable orientation (e.g., upside down), write operations may be suspended until acceleration data satisfies criteria that specifies appropriate acceleration data values for writing data.

In some implementations, a host may be a media player. The processor of the media player may continuously retrieve acceleration data. An accelerometer coupled to the nonvolatile memory of the media player may provide acceleration data. Nonvolatile memory may be coupled to the processor of the media player via a bus. Acceleration data may be transmitted to the processor from the memory via one or more pins of the bus. At least one pin may be dedicated to transmitting acceleration data from the nonvolatile memory to the processor of the media player. Acceleration data may be analyzed by an analysis module of the processor. Other data such as GPS data or positional data may also be analyzed and one or more operations may be performed based on the acceleration data and/or other data. For example, a message (e.g., visual and/or audio) may be transmitted to a user of the media player. The message may include position, speed, and/or distance traveled by the user. As another example, after a specified distance is traveled by a user, media played by the media player may be changed (e.g., from one playlist to another playlist).

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, processor may detect changes in operations of a memory or failure of a memory based on the accelerometer data and perform various operations in response. As another example, accelerometer data may be transmitted from a processor of a host to a processor of an external host and the external host may perform one or more operations. Among other modifications, the described operations may be performed in a different order than is described and some operations may be added or deleted. For example, acceleration data may be transmitted in response to a request for the acceleration data. As another example, an orientation of the device may be determined. Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method comprising:
   detecting acceleration data using an accelerometer affixed to a disk drive of a device;
   transmitting acceleration data from the accelerometer to a memory controller of the disk drive of the device;
   interrupting a currently-executed command for the disk drive in response to at least the acceleration data received directly from the accelerometer indicating a predefined acceleration,
   storing the acceleration data from the accelerometer in the disk drive;
   receiving, from a processor of the device, a request for current acceleration data prior to the processor executing a subsequent command with the disk drive;
   transmitting the current acceleration data from the disk drive to the processor of the device, and delaying execution of the subsequent command in response to at least the requested acceleration data indicating at least a predefined acceleration or orientation.

2. The method of claim 1 further comprising requesting acceleration data from the disk drive.

3. The method of claim 1 wherein the acceleration data comprises analog data.

4. The method of claim 1 wherein the acceleration data comprises preprocessed data.

5. The method of claim 1 further comprising determining an orientation of the device based on the transmitted acceleration data and performing one or more operations based on the determined orientation.

6. The method of claim 1 wherein transmitting the acceleration data from the disk drive to the processor comprises:
   transmitting the acceleration data from the accelerometer to the disk drive using a bus coupling the accelerometer and the disk drive; and
   transmitting the acceleration data from the disk drive to the processor via a bus coupling the disk drive and the processor.

7. An article comprising a non-transitory machine readable medium storing instructions for analyzing accelerometer data, the instructions operable to cause a processor of a data processing apparatus to perform operations comprising:
   sending a request for acceleration data to a disk drive of a device across a bus coupled to the disk drive, wherein acceleration data is provided to the disk drive by an accelerometer, the accelerometer at least affixed to the disk drive;
   transmitting acceleration data from the accelerometer to a memory controller of the disk drive of the device;
   interrupting a currently-executed command for the disk drive in response to at least the acceleration data received directly from the accelerometer indicating a predefined acceleration;
   storing the acceleration data from the accelerometer in the disk drive;
   receiving, from the processor, a request for current acceleration data prior to the processor executing a subsequent command with the disk drive;
   transmitting the current acceleration data from the disk drive to the processor of the device; and
   delaying execution of the subsequent command in response to at least the requested acceleration data indicating at least a predefined acceleration or orientation.

8. The article of claim 7 wherein the instructions are further operable to cause data processing apparatus to perform operations comprising performing an analysis of the acceleration data and performing one or more operations based on the analysis.

9. An electronic device comprising:
   an accelerometer affixed to a disk drive of a device and operable to provide acceleration data to the disk drive of the device;
   a disk drive configured to store the acceleration data from the accelerometer in the disk drive, receive, from a processor, a request for current acceleration data prior to the processor executing a subsequent command with the disk drive, and transmit the current acceleration date from the disk drive to the processor of the device;
   a memory controller operable to interrupt an executing command for the disk drive in response to at least acceleration data received directly from the accelerometer indicating a sudden acceleration;
   the processor including an analysis module operable to retrieve the acceleration data from the disk drive and delay execution of a subsequent command in response to at least the retrieved acceleration data indicating at least a predefined acceleration or orientation; and
   a bus coupling the analysis module to the disk drive, wherein the acceleration data is transmitted via the bus.

10. The device of claim 9, wherein the processor is operable to control the operations of the device and access data stored on the disk drive, and wherein the processor is operable to execute the analysis module.

11. The device of claim 10 wherein the bus comprises a serial bus.

12. The device of claim 11 wherein the bus includes an electrical connector including a plurality of pins, and wherein at least one of the pins is configured to transmit data between the disk drive and the processor.

13. The device of claim 12 wherein the data is continuously transmitted from the disk drive to the analysis module.

14. The device of claim 9 wherein the acceleration data comprises analog data, and wherein the analysis module is operable to analyze the analog data.

15. The device of claim 9 wherein the first bus comprises a serial bus.

16. The device of claim 9 wherein the disk drive is operable to perform operations based on the acceleration data provided by the accelerometer.

17. The device of claim 9 wherein the analysis module is operable to retrieve acceleration data when a specified operation occurs.

18. A system comprising:
   a means for detecting acceleration data affixed to a disk drive of a device;
   a means for transmitting acceleration data from the detecting means to a memory controller of the disk drive of the device;
   a means for interrupting a currently executed command for the disk drive in response to at least the acceleration data received directly from the accelerometer indicating a sudden acceleration;
   a means for storing the acceleration data from the accelerometer in the disk drive;
   a means for receiving from a processor, a request for current acceleration data prior to a processor executing a subsequent command with the disk drive;
   a means for transmitting the current acceleration data from the disk drive to the processor; and
   a means for delaying execution of the subsequent command in response to at least the acceleration data indicating at least a predefined acceleration or orientation.

19. The system of claim 18 further comprising a means for presenting a graphical interface, wherein the graphical interface is at least partially based on the acceleration data.

* * * * *